ELECTRONIC MULTIPLIER

Original Filed July 29, 1955

INVENTOR.

Dana M. Collier
BY Leighton A. Meeks &
James P. Palmer

Roland A. Anderson
ATTORNEY

ELECTRONIC MULTIPLIER

Original Filed July 29, 1955

3 Sheets-Sheet 2

INVENTOR.
Dana M. Collier,
BY Leighton A. Meeks &
James P. Palmer
Roland A. Anderson
ATTORNEY Jan. 31, 1961 D. M. COLLIER ET AL 2,969,915

ELECTRONIC MULTIPLIER

Original Filed July 29, 1955 3 Sheets-Sheet 3

INVENTOR.

Dana M. Collier,
BY Leighton A. Meeks &
James P. Palmer

Roland A. Anderson
ATTORNEY

United States Patent Office 2,969,915

Patented Jan. 31, 1961

2,969,915

ELECTRONIC MULTIPLIER

Dana M. Collier and Leighton A. Meeks, Oak Ridge, Tenn., and James P. Palmer, Stony Brook, N.Y., assignors to the United States of America as represented by the United States Atomic Energy Commission Original application July 29, 1955, Ser. No. 525,412, now Patent No. 2,936,119, dated May 10, 1960. Divided and this application Jan. 22, 1957, Ser. No. 635,556

2 Claims. (Cl. 235—194)

This invention relates to an improved electronic multiplier especially adapted for use in analog computers such as that described in our co-pending application S.N. 525,412, filed July 29, 1955, now Patent No. 2,936,-119, issued May 10, 1960. This application is a divisional application of that co-pending application.

A primary object of this invention is to provide a more accurate, fast multiplier circuit. Another object of this invention is to provide a reliable, fast and accurate electronic multiplier for producing a final peak voltage proportional to the product of two time-variable input voltages.

Yet another object of the invention is to provide a novel electronic fast multiplier circuit, especially suited for electronic analog computers.

These and other objects of our invention will become apparent from the following detailed description of a preferred embodiment thereof, when read in conjunction with the appended drawings, in which.

Multiplication is accomplished by means of a novel system operating to produce a rectangular pulse, the time duration of which is proportional to one variable, using this pulse to switch an integrator which made to integate at a rate proportional to the other variable, and detecting the peak voltage attained, which is then proportional to the product of the rate and the time inputs.

Figures 1, 2:
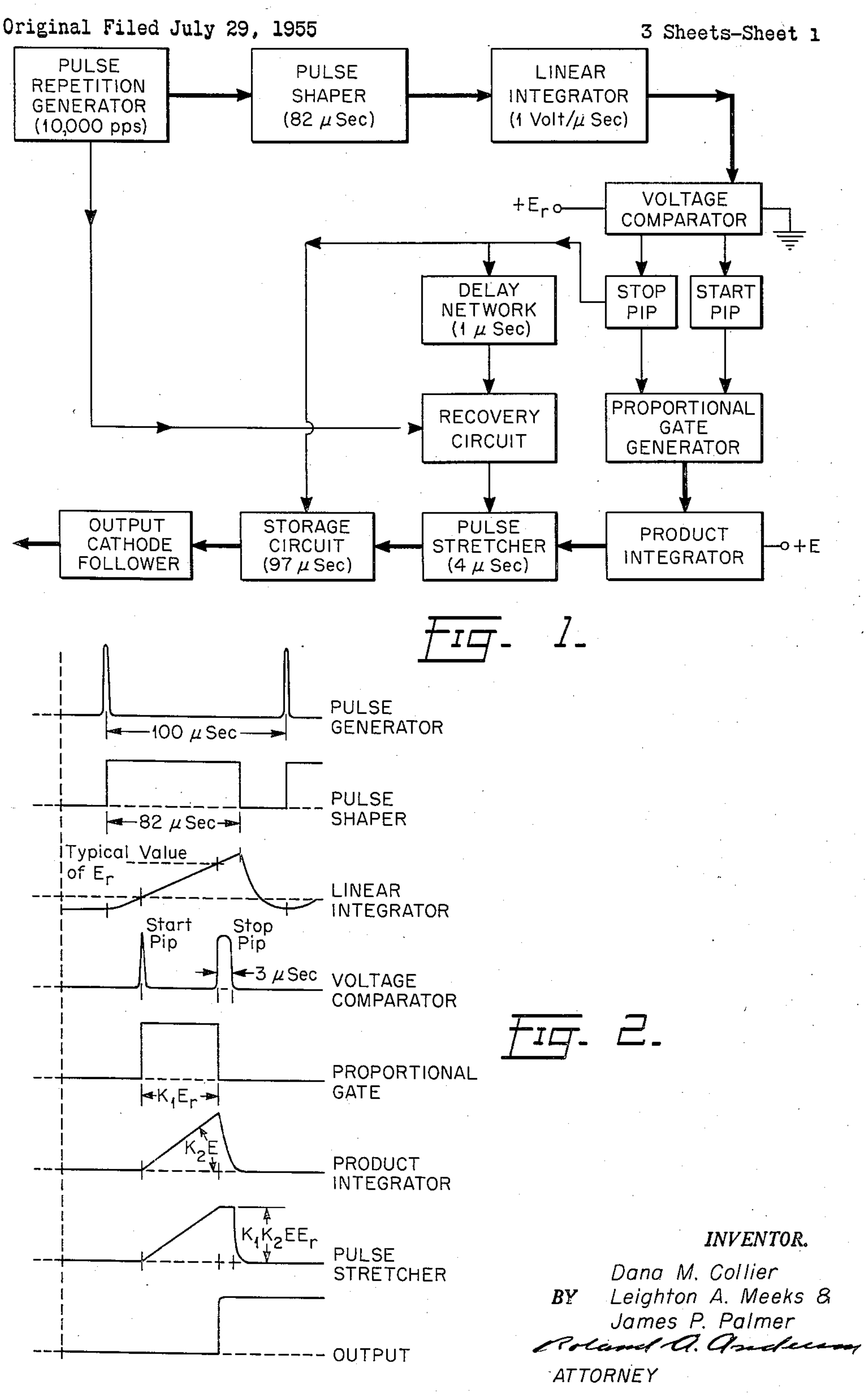
Figure 1 is a block diagram of a novel multiplier incorporated in the simulator.
Figure 2 is a timing chart showing the waveforms at various points in the block diagram of Figure 1.

Referring now to Figure 1, the pulse repetition generator may be a frequency-stabilized blocking oscillator operating at 10 kilocycles. Utilizing a high sampling rate minimizes the chance for error, although the rate itself is not critical. Output pulses are shaped in the pulse shaper network, which may be a one-shot multivibrator which produces rectangular pulses of about 82 microseconds' duration. These pulses are fed to a linear integrator to switch it on and off. The integrator may be a sweep circuit having an output voltage rising at a constant rate, say 1 volt per microsecond. To avoid nonlinearity in the first few microseconds or integration, the integrators are biased so that the output voltages start at about ±3 volts and then sweeps positive and negative, as will be described later.

The saw-tooth wave output of the integrator is fed into the voltage comparator, which is also connected to ground and to a constant voltage $E_T$. When the sweep voltage reaches ground potential, a Start Pip is generated by a blocking oscillator coupled to the comparator. When the voltage rises to equal $E_T$, a Stop Pip is generated by a second blocking oscillator. The Start and Stop Pip pulses are coupled through diode clamps to the proportional gate generator, which may be a condenser coupled to a cathode follower to set its grid voltage. The Start Pip causes the voltage across the condenser to rise quickly to a positive value, while the leading edge of the Stop Pip causes the condenser to discharge quickly to a negative voltage. Thus the output cathode follower in the gate generator produces a positive pulse whose time duration is proportional to the voltage $E_T$. The pulse from the gate generator is coupled through diode clamps to the grid of the product integrator to allow it to integrate only for the gate pulse duration, which is the period of time between the two pips. The second variable, E, is applied as the voltage which sets the rate of integration of the product integrator, so that integration proceeds at a rate proportional to E for a time proportional to $E_T$.

The output voltage of the product integrator is connected through diode clamps to a condenser in the pulse stretcher. The diodes are so arranged that the condenser voltage follows the output voltage of the integrator up, but when the integrator voltage drops down, the diode clamp circuit isolates the condenser to sustain it at its crest voltage momentarily. The Stop Pip is applied to a delay network and also to an electronic switch coupled to a small condenser in the storage circuit. Receipt of the pip by the switch allows the condenser to charge for the 3 microsecond's duration of the Stop Pip, then the condenser is isolated from the pulse stretcher. The Stop Pip also is passed through a delay network, and the trailing edge of the resulting pulse actuates a flip-flop in the recovery circuit to change its state to produce a negative signal. This signal is clamped to the pulse stretcher condenser and causes it to become uncharged. Meanwhile, the storage circuit, now isolated by action of the electronic switch from the changes in voltage in the pulse stretcher, causes the output cathode follower to maintain a steady voltage proportional to the peak voltage attained by the product integrator during its last integration. The next pulse received from the pulse repetition generator restores the flip-flop in the recovery circuit to its normal state, producing a positive signal which is coupled to the pulse-stretcher circuit to condition it to follow the product integrator during the next integration cycle, and at the same time this next pulse starts the chain of operation through the pulse shaper, linear integrator, and so forth.

Figure 3:
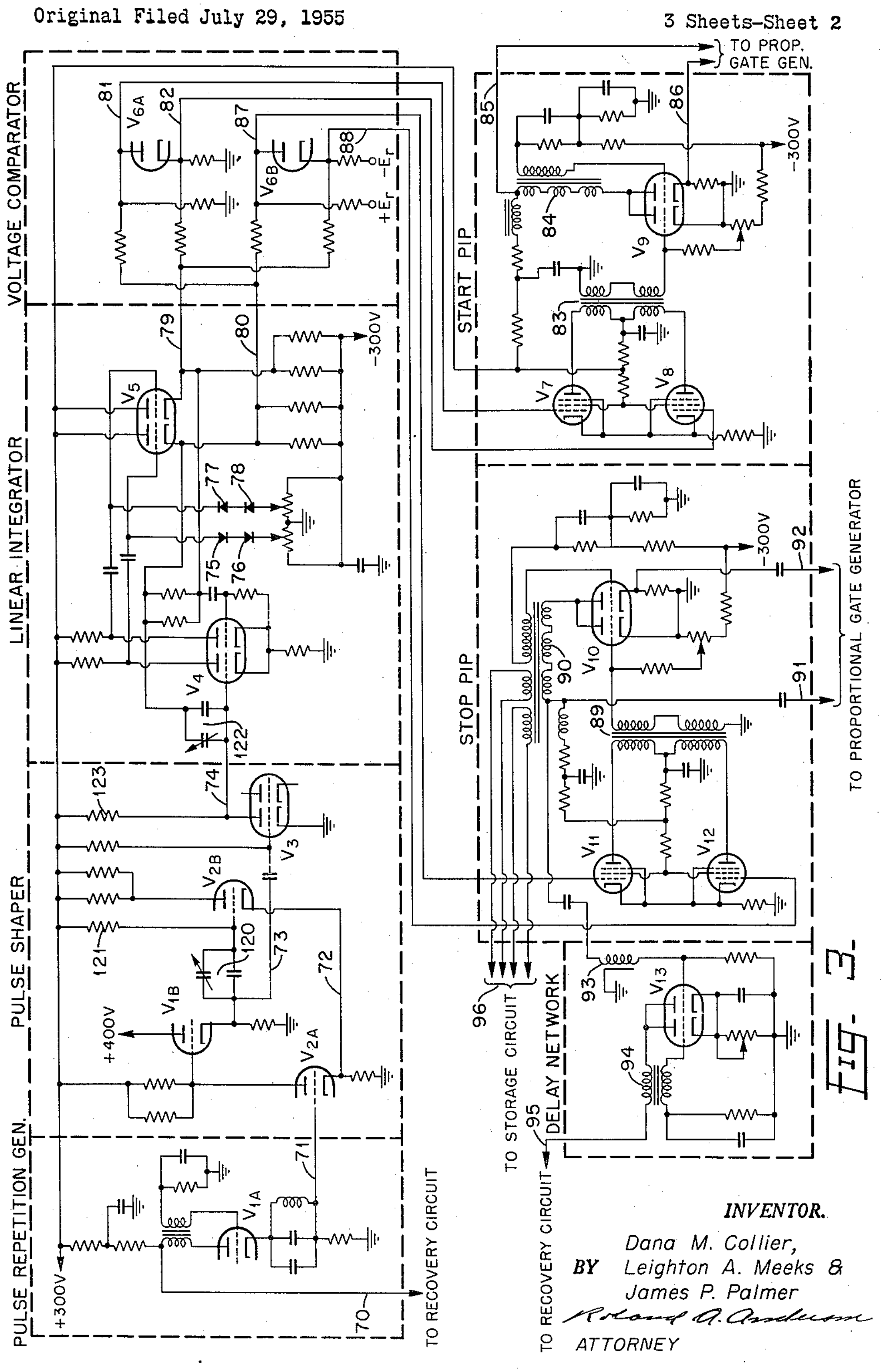
Figure 3 is a partial schematic diagram of a preferred form of the multiplier shown in Figure 1.
Figure 4:
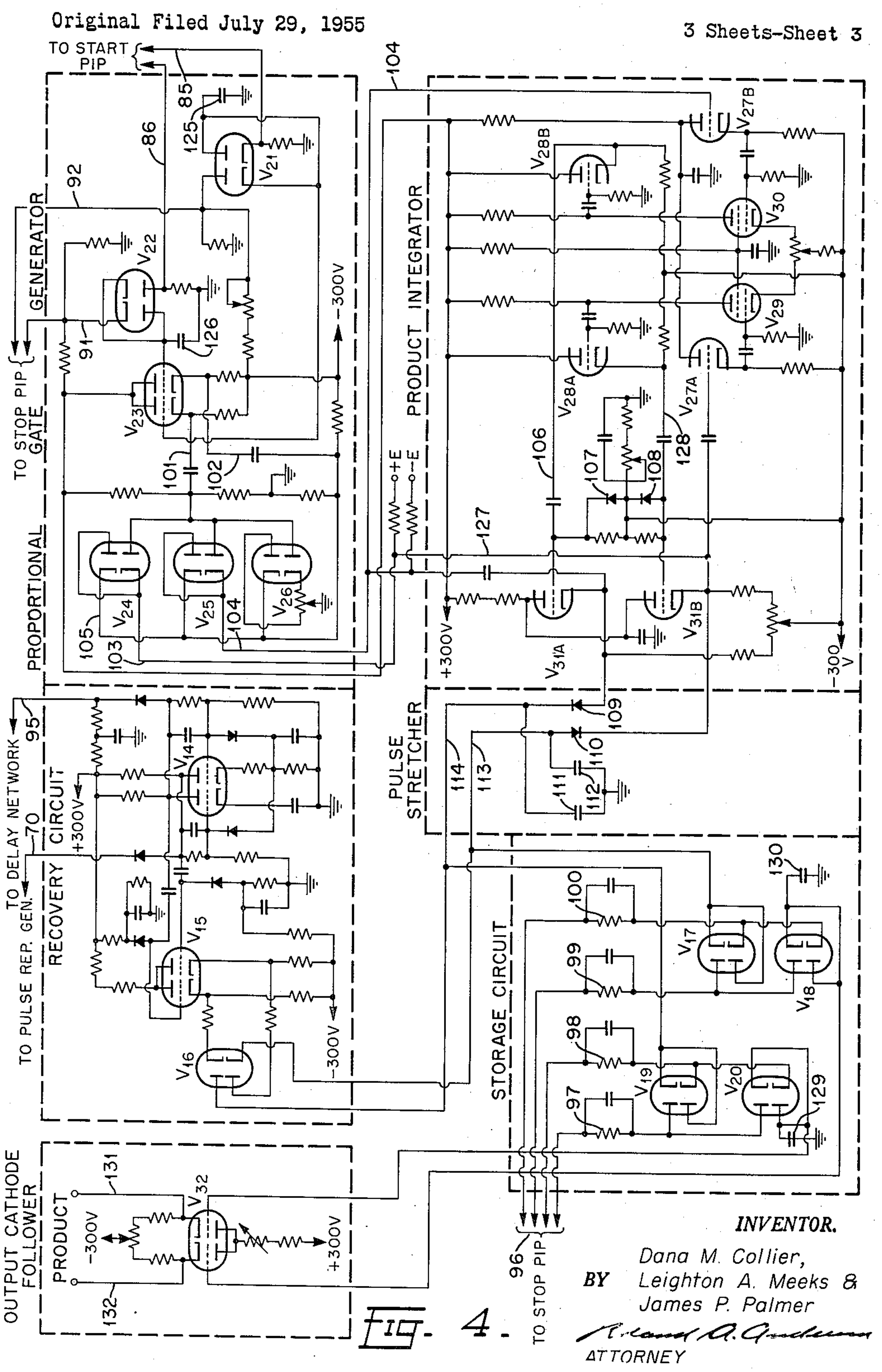
Figure 4 shows the remainder of the multiplier circuit illustrated in block form in Figure 1.

Referring now to Figures 3 and 4, tube V1A is utilized as a free-running blocking oscillator, stabilized at a frequency of substantially 10 kilocycles by a tank circuit in the cathode circuit. Positive pulses are taken from the oscillator on lead and applied to the control grid of tube V2A, each pulse causing that tube to conduct. During conduction, its plate potential drops, impressing a negative pulse on the control grid of tube V1B, a cathode follower. The corresponding negative pulse at the cathode of tube V1B is coupled through condensers 120 to the control grid of tube V2B, the cathode of which is coupled to the cathode of tube V2A. The resulting negative pulse at the cathode of tube V2B pulls down the cathode voltage of tube V2A to insure that tube V2A conducts sufficient current to cut off tube V1B. The duration of the negative pulse produced on lead 73 is determined by the values of condensers 120 and resistor 121, since the condenser charges through the resistor until tube V2B begins to conduct, raising its cathode potential and pulling up on the cathode potential of tube V2A to cut off that tube, since, in addition, the positive pulse has ended on its grid. The potential at the grid of tube V1B then rises toward +300 volts, tube V1B begins to conduct, and its cathode potential rises to effect the end of the negative pulse on lead 73.

The lett section of tube V3 is used as an electronic switch for the linear integrator, which may comprise an amplifier V4—V5 provided with feed-back condensers 122 which are coupled to the B+ voltage through lead 74 and resistor 123. To produce opposite polarity signals, both positive and negative, a positive signal at the grid of V4 produces a negative pulse at its plate and at the corresponding left grid of V5. A negative pulse appears at the left cathode of V5, and therefrom to the right grid of V4, causing a positive pulse to appear at the grid and cathode of V5. The integrator outputs are positive and negative-going saw-tooth voltages taken from the respective cathodes of tube V5 on leads 79, 80. When the negative pulse turns off V3, the potential on lead 74 begins a linear rise toward +300 volts at a slope determined by the time constant of resistor 123 and condensers 122. At the beginning of this rise, the waveforms on leads 79, 80 are not exactly linear, but are curved. To throw away this part of the non-linear portion of the waveforms, biasing diodes 75–78 are provided to adjust the respective grid bias as of the secions of tube V5. The exact voltage or bias may be adjusted by the potentiometers coupled to diodes 76, 78, one grid being biased to about +2 volts while the other grid is biased to about −2 volts so that the entire waveform on lead 74 is not reproduced on leads 79, 80, but rather only the linear portion appears.

The signal on leads 79, 80 are respectively a positive and a negative-going saw-tooth voltage having a linear slope of a predetermined value. The positive saw-tooth is applied to the cathodes of diodes V6A, V6B, while the negative saw-tooth is applied to the plates of the diodes. The plate and cathode of diode V6A are returned through resistors to ground, while the plate and cathode of tube V6B are returned through resistors to the first variable inputs, to receive voltages equal to $+E_T$ and $-E_T$, respectively. Normally both diodes conuduct but when they receive the two saw-tooth voltages, they are cut off and present high impedances to the following pulse generators the time when the cathodes begin to go more positive than the plates. Since tube V6A is returned to ground, its cut off occurs when the saw-tooth voltages cross the ground potential line, while for tube V6B, returned to $\pm E_T$, the cut off does not occur until later, when the saw-tooth voltages overcome the bias voltages $+E_T$ and $-E_T$. The outputs across the diodes are coupled on leads 81, 82 and 87, 88 to the Start Pip through Stop Pip pulse generators, respectively. Thus diode V6B cuts off after tube V6A by a time proportional to $E_T$, since the saw-tooth voltages vary linearly with time.

The signals on leads 81, 82 are coupled to tubes V7, V8 where they are amplified and fed to the primary windings of transformer 83. The secondary windings are coupled to the control grid of one section of tube V9, which is a blocking oscillator which generates positive and negative Start Pips on leads 85, 86. In like manner the signals on leads 87, 88 are coupled to amplifier tubes V11, V12 and to transformer 89, through which the signals trigger blocking oscillator V10 to produce positive and negative Stop Pips on output leads 91, 92. Additional output signals are taken from the secondary windings of the blocking oscilaltor transformer 90 to the storage circuit through leads 96. It will be noted in the above voltage comparator circuit that two diodes are used with two signals driving each diode. The use of double signals provide a much sharper cut off point, while by use of dual diodes in the same envelope the drift of one diode is counter balanced by that of the other, since both diodes tend to drift in the same direction by similar amounts so that the difference in drift is very small. Moreover, by using dual circuitry, the loss of time in firing the blocking oscillator V9 from the amplifier tubes is not critical, since equal time delays result.

Referring now to Figure 4, the proportional gate generator may comprise diodes V21, V22 which receive the positive and negative Start Pip signals on leads 85, 86. The two diodes comprising V21 are connected in series and a condenser 125 is coupled between their junction and ground. Similarly the two halves of diode V22 are connected in series with condenser 126 coupled between their junction and ground. Operation of V21 and V22 diode gates is similar, one being for positive pulses and the other for negative pulses, so that only one will be described. When a positive Start Pip is received on lead 86, diodes V22 conduct and charge condenser 126. At the end of the Start Pip, the diodes no longer conduct but the condenser remains charged. Then upon occurrence of a negative Stop Pip on lead 91, the left half of diode V22 conducts away the charge on the condenser. During the time the condenser is charging, the right section of tube V23 conducts, producing an output signal on lead 102 which follows the charge on the condenser. Since the time the condenser remains charged depends upon the time between the Start and Stop Pips, which in turn is proportional to $E_T$, the signal on lead 102 is a rectangular positive pulse of width proportional to $E_T$. In like fashion, lead 101 receives a rectangular negative pulse of equal width.

The product integrator is an integrating amplifier similar in operation to the linear integrator, and is controlled through diode gates V24, V25 by the signals on leads 101, 102. One end of diode gate V24 is returned to the second variable input to receive a voltage equal to +E, while one end of diode gate V25 is returned to the −E input to establish the voltages toward which integration progresses during the enabled period. The input of one side of the amplifier is connected through lead 127 to the control grid of tube V27A. A signal from the cathode of tube V27A is coupled to the control grid of tube V29, which tube is cathode-coupled to tube V30. Similarly the input to the other side of the amplifier is coupled along lead 104 to the input of tube V27B, a signal is taken from its cathode to tube V30, and from the plate of V30 a signal is coupled to the grid of tube V28B, the cathode of which is in turn coupled through lead 106 to the grid of cathode follower V31A. In like manner from the plate of tube V29, a signal is coupled to the grid of tube V28A and from the cathode of that tube to the grid of cathode follower V31B along lead 128. The cathodes of tubes V28A and V28B are coupled.

Upon receipt of the positive and negative pulses on leads 102, 101, which are coupled to the opposite ends of the diode gate V24, V25, the diodes are cut off, removing the input voltage from the input leads 127, 104 to the amplifiers, and allowing the inputs to integrate toward ±E. Since the duration of cut off of the diode gates is determined by the width of the pulses on leads 101, 102, the amplifier will integrate for a time proportional to the width and therefore to $E_T$. Since the potentials toward which the inputs 127, 104 proceed when cut off are +E and −E, the slope of the resulting input waveform will be proportional to +E and −E respectively. Condensers 111, 112 are connected to the outputs of the cathode followers V31A, V31B, and will charge to the crest voltage attained by the respective followers. Diodes 109, 110 allow the condensers to charge, but prevent leakage of the charge when the cathode voltages on the followers fall.

The Stop Pip signals on the leads 96 are coupled to diode bridges V19, V20, and V17, V18 through RC networks 97–100. The Stop Pip signals turn on the diode bridges to allow condensers 129, 130 to charge up from condensers 111, 112 through leads 114, 113. These condensers are much smaller than condensers 111, 112 and charge up quickly without drawing significant charge off condensers 111, 112. The voltage across condensers 129, 130, is applied to the control grids of cathode followers V32, and output voltages proportional to the "+" and "−" products are derived on leads 131, 132. When the Stop Pips end on leads 96, the diode gates V19, V20 and V17, V18 again isolate condensers 129, 130 from condensers 111, 112.

As may be seen from Figure 3, the Stop Pip is also applied through a delay line 93, which may be a one microsecond line, to a blocking oscillator V13, the output of which is applied through lead 95 to the recovery circuit, Figure 4. The pulse on lead 95 is applied to trigger bistable flip-flop circuit V14 to open a diode gate. The flip-flop is coupled through cathode followers V15 to one end of the diode gate V16. When the gate is open, the diodes conduct away the charge on condensers 111, 112. The next pulse from the pulse repetition generator, lead 70, is applied to tube V14 to reset the flip-flop to the normal state, closing the diode gate V16, and isolating the storage condensers 111, 112.

With a sampling rate of 10 kilocycles, it may be seen that condensers 129, 130 are adjusted to receive a voltage proportional to the product of E and $E_r$ each 100 microseconds.

It will be apparent to those skilled in the art that we have provided an improved fast multiplier circuit for providing and storing temporarily a crest or peak voltage proportional to the product of two input time-variable voltages.

Having described our invention, we claim as novel:

1. A multiplier circuit for providing an output voltage proportional to the product of first and second variables comprising: means for generating a first train of pulses of uniform duration, means for controlling said duration in accordance with the magnitude of said first variable, an integrator coupled to said generating means to receive said pulses and adapted to deliver an electrical output, means coupled to said integrator for regulating the time and rate of integration responsive to the magnitude of said first and second variables respectively, means sustaining the crest voltage generated by said integrator, charge storage means alternately coupled to or isolated from said sustaining means, and circuit means responsive to said generating means for isolating said storage means from said sustaining means after a selected time interval and for releasing said crest voltage from said sustaining means, said storage means thereby providing an output voltage proportional to the peak integrated voltage and to the product of said variables.

2. A multiplier circuit comprising means for generating a train of impulses of selected duration, a first integrator circuit for generating a timing voltage changing uniformly with time, means for energizing said circuit responsive to each of said impulses; means for generating first and second gate signals as said timing voltage reaches selected first and second magnitudes, a second integrator for generating a product voltage changing uniformly with time, means for energizing said second integrator responsive to said first gate signal and for deenergizing said second integrator responsive to said second gate signal, means for storing the crest voltage of said product voltage, means for deriving an output signal proportional to said crest voltage, means for deriving a stop gate signal from said second gate signal, a bistable circuit having low and high input impedance states and coupled to said storing means to hold or empty the same, means for delaying said stop gate signal coupled to said bistable circuit to actuate said bistable circuit to the state to empty said storing means, and means for resetting said bistable circuit to the state for holding said storing means responsive to each of said impulses in said train.

References Cited in the file of this patent

UNITED STATES PATENTS

| | | |
|---|---|---|
| 2,773,641 | Baum | Dec. 11, 1956 |
| 2,880,935 | Johnson | Apr. 7, 1959 |

OTHER REFERENCES

Electronic Analog Computers (Korn & Korn), 1952; p. 223.

Proceedings of the IRE (Broomall et al.), May 1952; pages 568–572.

RCA Review (Goldberg), September 1952; pp. 265–273.

UNITED STATES PATENT OFFICE

CERTIFICATE OF CORRECTION

Patent No. 2,969,915 January 31, 1961

Dana M. Collier et al.

It is hereby certified that error appears in the above numbered patent requiring correction and that the said Letters Patent should read as corrected below.

Column 1, line 46, after "which" insert -- is --; lines 46 and 47, for "integate" read -- integrate --; column 2, line 52, after "lead" insert -- 71 --; column 3, line 21, for "secions" read -- sections --; line 36, for "conuduct" read -- conduct --; line 45, for "on" read -- through --; line 46, for "through" read -- and --; line 61, for "oscilaltor" read -- oscillator --.

Signed and sealed this 17th day of October 1961.

(SEAL)
Attest:

ERNEST W. SWIDER
Attesting Officer

DAVID L. LADD
Commissioner of Patents

USCOMM-DC